(12) United States Patent  (10) Patent No.: US 7,787,194 B2
Nairn et al.  (45) Date of Patent: Aug. 31, 2010

(54) ADJUSTABLE LENS MOUNTING ASSEMBLY

(75) Inventors: Mark Nairn, Gifford (GB); David Mcardle, Edinburgh (GB)

(73) Assignee: STMicroelectronics (Research & Development) Limited, Buckinghamshire (GB)

(*) Notice: Subject to any disclaimer, the term of this patent is extended or adjusted under 35 U.S.C. 154(b) by 0 days.

(21) Appl. No.: 12/358,854

(22) Filed: Jan. 23, 2009

(65) Prior Publication Data

US 2009/0268317 A1 Oct. 29, 2009

(30) Foreign Application Priority Data

Apr. 25, 2008 (EP) .................... 08155150

(51) Int. Cl.
*G02B 15/14* (2006.01)

(52) U.S. Cl. ..................................... 359/704

(58) Field of Classification Search ............... 359/704; 396/533
See application file for complete search history.

(56) References Cited

U.S. PATENT DOCUMENTS

| 5,969,858 A | 10/1999 | Funatsu |
| 6,979,144 B2* | 12/2005 | Iwasaki .................. 403/359.6 |
| 2002/0089176 A1 | 7/2002 | Iwasaki |
| 2005/0280908 A1 | 12/2005 | Tanaka |

OTHER PUBLICATIONS

European Search Report, EP 08 15 5150, dated Sep. 23, 2008.

* cited by examiner

*Primary Examiner*—Joseph Martinez
(74) *Attorney, Agent, or Firm*—Gardere Wynne Sewell LLP

(57) ABSTRACT

An adjustable lens mounting assembly has a detent system which provides a defined vertical movement of a lens per detent index. A calibration of a lens during assembly of an image sensor is therefore achieved with no moving parts, and generation of foreign material is minimized. Furthermore, gluing of the components can be dispensed with.

26 Claims, 1 Drawing Sheet

ADJUSTABLE LENS MOUNTING ASSEMBLY

PRIORITY CLAIM

The present application claims the benefit of European Application for Patent No. 08155150.9 filed Apr. 25, 2008 entitled "Adjustable Lens Mounting Assembly", the disclosure of which is hereby incorporated by reference to the maximum extent allowable by law.

BACKGROUND OF THE INVENTION

1. Technical Field of the Invention

The present invention relates to a mounting arrangement for a lens or a lens assembly which permits calibration of the lens focus during assembly of an image sensor. The invention is particularly, but not exclusively, applicable to the manufacture of small, inexpensive solid state image sensors for use in products such as cameras, mobile telephones, webcams or medical devices. The invention has particular, but not exclusive, application to autofocus lens mounting assemblies for such devices.

2. Description of Related Art

It is known to provide an image sensor assembly comprising a solid state single chip image sensor and a lens, wherein the position of the lens can be adjusted with respect to the image sensor during manufacture to achieve optimal focus of the image sensor on the surface (i.e. to permit calibration of the image sensor assembly). Typically the lens is mounted in a lens barrel which has a screw threaded engagement with a chip mount. Calibration of the focus of the lens can then be achieved by relative rotation of the lens barrel within the chip mount.

Typically it is necessary to move the lens barrel with respect to the image sensor through increments of as little as 5 μm to achieve the required focus adjustment. This can be achieved by proving a thread having a pitch of 0.35 mm whereby 5° rotation of the lens barrel with respect to the chip holder provides an axial adjustment of the lens of 5 μm.

The lens barrel must subsequently be locked relative to the chip holder, for example by bonding with an adhesive. However, the calibration of the lens focus is achieved in an automated process in a clean room environment that is not tolerant to the presence of adhesive. Therefore it is typically necessary to apply adhesive to lock the lens barrel in position in a separate step at a separate location from the focus calibration step. There is a risk that the lens barrel may move relative to the chip holder during transfer of the image sensor assembly between said steps, resulting in incorrect calibration of the lens.

One known way to avoid this problem is to provide a tight interference fit between at least a portion of the lens barrel and the chip holder. However, this leads to the risk of small particles being dislodged from the cooperating surfaces of the lens barrel and the chip holder leading to contamination of the lens and unacceptable image quality. Furthermore, in the case of autofocus lenses, the lens barrel is mounted within an actuator carriage assembly which is in turn adjustably mounted on the chip holder. Size limitations limit the possible wall thickness of the actuator carriage assembly such that the assembly is not tolerant of such an interference fit between the lens barrel and the actuator carriage assembly without risking damage to the actuator carriage assembly.

SUMMARY OF THE INVENTION

According to an embodiment, a mounting assembly for positioning a lens or lens assembly relative to an image sensor chip comprises: a lens barrel adapted to hold a lens or a lens assembly; a chip mount assembly adapted to receive an image sensor chip; the lens barrel and a portion of the chip mount assembly being provided with cooperating screw threads to enable the lens or lens assembly to be moved along an optical axis relative to the image sensor chip to adjust the focus on the image sensor chip by rotation of the lens barrel with respect to said portion of the chip mount assembly; wherein one of said portion of the chip mount assembly and said lens barrel is provided with detented surface comprising a plurality of discrete recesses, the other of said portion of the chip mount assembly and said lens barrel being provided with at least one first projection, said projection being biased against said detented surface whereby said at least one first projection is engageable with said plurality of discrete recesses of the detented surface to define a plurality of first stable positions of said lens barrel with respect to said portion of the chip mount.

Preferably wherein said other of said portion of the chip mount assembly and said lens barrel is provided with at least one second projection, said at least one second projection being circumferentially offset with respect to said at least one first projection such that the at least one second projection is engageable with said plurality of discrete recesses of the detented surface to define a second stable position of said lens barrel with respect to said chip mount assembly portion intermediate each of said plurality of first stable positions.

Preferably movement of the lens holder between each first stable position and an adjacent second stable position results in an axial movement of the lens barrel with respect to the portion of the chip mount assembly of less than 10 μm, more preferably approximately 5 μm.

The or each projection may be formed integrally with said lens barrel or may be formed separately.

Preferably the or each projection extends substantially perpendicularly and outwardly from a distal end of a resilient finger extending from a region of said lens barrel. The or each resilient finger may extend substantially tangentially from said region of said lens barrel.

In one embodiment, the or each resilient finger may be defined by a slot having a first part extending substantially radially inwardly from an outer surface of the lens barrel and a second part extending from an inner end of said first part substantially concentrically to the outer surface of the lens barrel.

Preferably at least three first projections are provided arranged at equal circumferential spacing around said detented surfaced such that the biasing force imparted onto the lens barrel by the action of said projections against said detented surface maintains axial alignment of the lens barrel with the optical axis. One second projection may be provided between each adjacent pair of first projections.

In one embodiment, where the lens mounting assembly comprises an autofocus lens, the portion of said chip mount assembly provided with said cooperating screw thread for mounting said lens barrel may comprise an actuator carriage assembly mounted for movement along the optical axis with respect to said image sensor chip by means of an actuator to permit adjustment of the lens focus during use.

The lens barrel and said portion of the chip mount assembly may be formed from a polymeric material or any other suitable material.

In another embodiment, a mobile device comprises the mounting assembly defined above. The mobile device may comprise a camera, or a mobile cellular telephone incorporating a camera.

In another embodiment, a medical device for viewing within a mammalian body comprises the mounting assembly defined above.

In another embodiment, a pointing device comprises the mounting assembly defined above.

In an embodiment, a mounting assembly comprises: a lens barrel adapted to hold a lens or a lens assembly; a carriage assembly receiving the lens barrel; a set of cooperating screw threads provided with the lens barrel and a portion of the carriage assembly to allow rotation of the lens barrel with respect to the carriage assembly to enable the lens or lens assembly to be moved along an optical axis and adjust focus; one of said carriage and said lens barrel having a detented surface comprising a plurality of discrete recesses, the other of said carriage and said lens barrel having at least one first projection biased against said detented surface, with said at least one first projection engaging with said plurality of discrete recesses of the detented surface to define a plurality of first stable rotational positions of said lens barrel with respect to said carriage assembly.

In an embodiment, an apparatus comprises: a disk shaped lens holder barrel; a carriage having a central bore which receives the disk shaped lens holder barrel; a detented surface comprising a plurality of discrete recesses extending around an inner surface of the central bore; a first projection from the lens holder barrel engaging with said detented surface; a second projection from the lens holder barrel engaging with the detected surface; the first projection and second projection being angularly displaced from each other such that when one of the first and second projections engages a discrete recesses of the detented surface the other of the first and second projections engages a ridge between adjacent discrete recesses.

In an embodiment, an apparatus comprises: a cylindrical lens holder barrel; a carriage having a central bore which receives the cylindrical lens holder barrel; a detented surface comprising a plurality of discrete recesses extending around an inner surface of the central bore and a ridge surface between adjacent recesses; a first set of projections extending radially from the lens holder barrel which engage with said detented surface; a second set of projections extending radially from the lens holder barrel which engage with the detected surface; the first set of projections engaging corresponding discrete recesses of the detented surface at a first angular position where the second set of projections engage ridge surfaces, and the second set of projections engaging corresponding discrete recesses of the detented surface at a second angular position where the first set of projections engage ridge surfaces.

BRIEF DESCRIPTION OF THE DRAWINGS

Other features and advantages will become clear in the description which follows of several non-limiting examples, with reference to the attached drawings wherein.

DETAILED DESCRIPTION OF THE DRAWINGS

Figure 2:
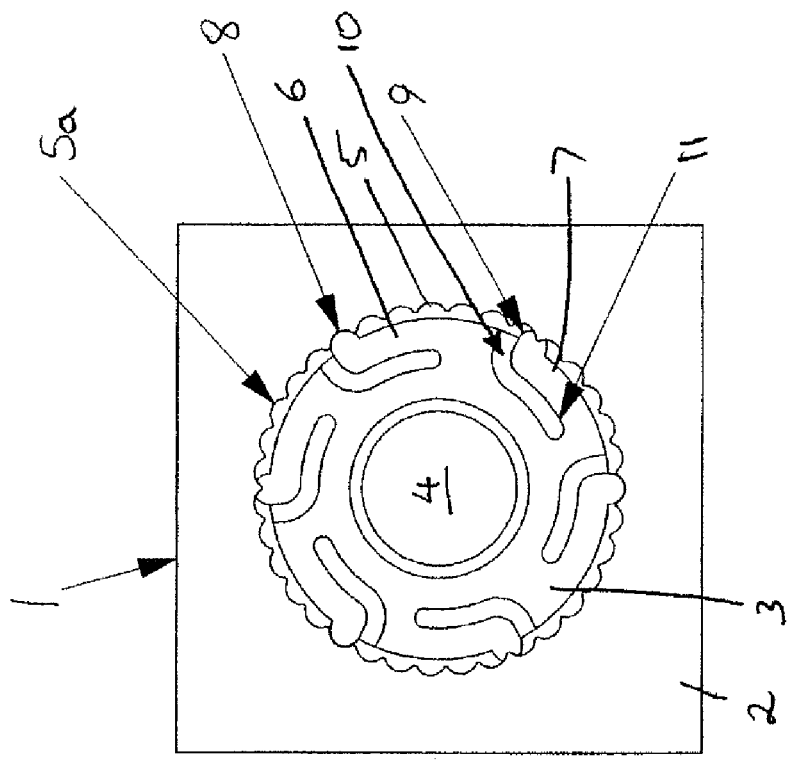
FIG. 2 is a plan view of the lens mounting assembly of FIG. 1.
Figure 1:
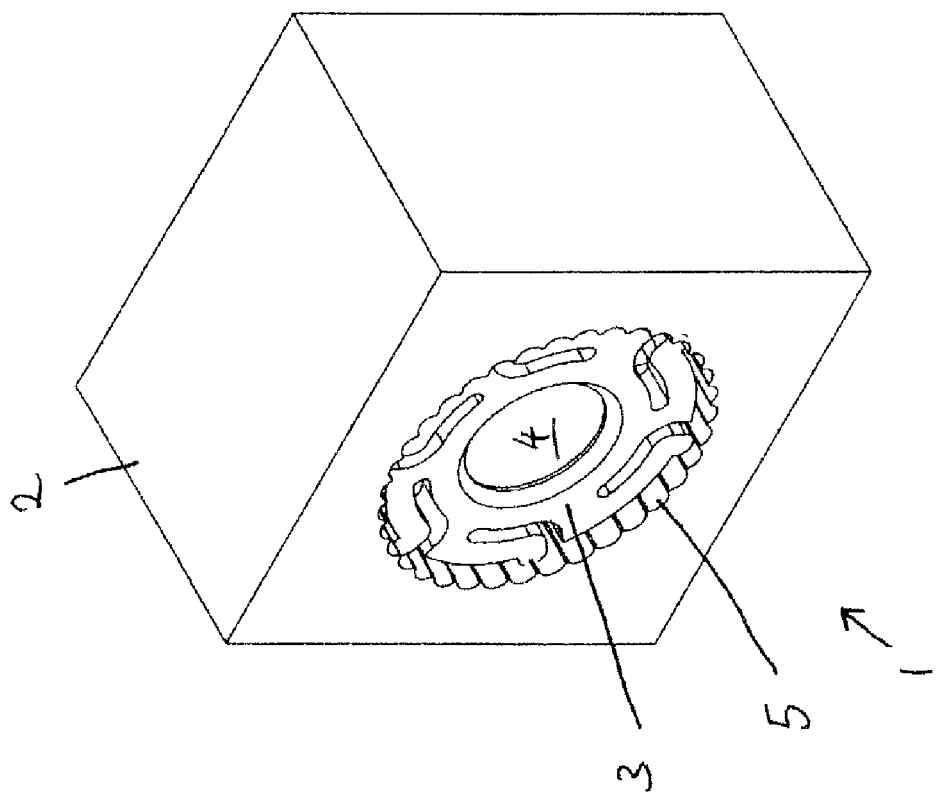
FIG. 1 is a perspective view of an adjustable lens mounting assembly according to an embodiment.

As shown in the drawings, an adjustable lens mounting assembly (wherein the assembly may be a part of a mobile device such as a camera or a mobile cellular telephone incorporating a camera, or medical device for viewing within a mammalian body, or a pointing device such as an optical mouse) 1 comprises an actuator carriage assembly 2 having a central bore receiving a lens barrel 3 having a lens or a lens assembly 4 mounted thereto. The actuator carriage assembly 2 is located on a chip mount (not shown), upon which is mounted a solid state single chip image sensor (also not shown), such that the image sensor is in alignment with the lens. Actuating means (not shown) is provided for adjusting the position of the actuator carriage assembly 2 with respect to the image sensor to provide adjustment of the focus of the lens during use.

A first region of the central bore of the actuator carriage assembly 2 is threaded to receive a correspondingly threaded region of the lens barrel 3 whereby rotation of the lens barrel 3 relative to the actuator carriage assembly 2 adjusts the position of the lens barrel 3 along the optical axis of the lens 4 by means to enable calibration of the default focus of the lens.

A second region of the central bore of the actuator carriage assembly, axially spaced from said first region, is provided with a detented surface 5 defined by a plurality of discrete recesses 5a spaced around the inner circumference of said second region.

A cooperating region of the lens barrel 3 is provided three equally circumferentially spaced first resilient fingers 6. The lens barrel 3 further includes three equally circumferentially spaced second resilient fingers 7 interposed between adjacent pairs of the first resilient fingers 6. A radial projection 8 and 9 being provided at a distal end of each finger 6 and 7, respectively, for engaging the detented surface 5 to define a plurality of discrete stable positions of the lens barrel 3 with respect to the actuator carriage assembly 2 such that the lens barrel can be rotated between said discrete stable positions to adjust the focus of the lens during a calibration process.

The projections 8 and 9 cooperate with the detented surface to 5 hold the lens barrel 3 in position with respect to the actuator carriage assembly 2 in each stable position of the lens barrel, preventing unintentional rotation of the lens barrel 3 following the focus calibration step. The mounting assembly can be subsequently moved to further manufacturing steps where an adhesive may be applied to fix the lens barrel 3 in position within the actuator carriage assembly 2.

Each resilient finger 6 and 7 is defined in the lens barrel 3 by a slot formed in the side of the lens barrel 3 having a first part 10 extending substantially radially inwardly from an outer surface of the lens barrel and a second part 11 extending from an inner end of said first part 10 substantially concentrically to the outer surface of the lens barrel 3.

The three first resilient fingers 6 are circumferentially offset from the second resilient fingers 7 by a distance equal to half of the width of each recess 5a of the detented surface 5 such that, when the projections 8 of the first resilient fingers 6 are engaged in respective recesses 5a of the detented surface 5, the projections 9 of the second resilient fingers 7 rest upon ridges between adjacent pairs of recesses 5a, and when the projections 9 of the second resilient fingers 7 are engaged in respective recesses 5a of the detented surface 5, the projections 8 of the first resilient fingers 6 rest upon ridges between adjacent pairs of recesses 5a, such that the number of stable positions of the lens barrel 3 with respect to the actuator carriage assembly 2 when the lens barrel 3 is rotated through one full revolution is equal to twice the number of recesses 5a provided on the detented surface 5. Thus, it is possible to provide sufficiently small stable incremental movements of the lens barrel 3 with respect to the actuator carriage assembly 2 to permit accurate calibration of the lens focus while the interaction of the projections 8, 9 of the resilient fingers 6,7 and the recesses 5a of the detented surface 5 prevents accidental movement of the lens barrel 3 with respect to the actuator carriage assembly 2 during transfer of the assembly between subsequent manufacturing steps.

If desired, in order to lock the lens barrel 3 in position within the actuator carriage assembly 2, an adhesive may be inserted into the slots in the lens barrel defining the resilient finger in order to prevent subsequent rotation of the lens barrel.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment. For example, the detented surface may be provided on the periphery of the lens barrel and the cooperating projections may be provided on the actuator carriage assembly. Each set of first and second projections may cooperate with separate detented surfaces. The mounting assembly may be used with both autofocus and non-autofocus lenses.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. Apparatus including a mounting assembly, comprising:
   a lens barrel adapted to hold a lens or a lens assembly;
   a carriage assembly receiving the lens barrel;
   a set of cooperating screw threads provided with the lens barrel and a portion of the carriage assembly to allow rotation of the lens barrel with respect to the carriage assembly to enable the lens or lens assembly to be moved along an optical axis and adjust focus;
   one of said carriage and said lens barrel having a detented surface comprising a plurality of discrete recesses, the other of said carriage and said lens barrel having at least one first projection biased against said detented surface, with said at least one first projection engaging with said plurality of discrete recesses of the detented surface to define a plurality of first stable rotational positions of said lens barrel with respect to said carriage assembly;
   wherein the or each projection extends substantially perpendicularly and outwardly from a distal end of a resilient finger extending from a region of said lens barrel.

2. The apparatus including a mounting assembly as claimed in claim 1 wherein said carriage assembly is mounted for movement along the optical axis by means of an actuator to permit adjustment of lens focus.

3. The apparatus including a mounting assembly as claimed in claim 1 wherein said lens barrel and carriage assembly are formed from a polymeric material.

4. The apparatus including a mounting assembly of claim 1 wherein the apparatus is a mobile device.

5. The apparatus including a mounting assembly of claim 4 wherein the mobile device is a mobile cellular telephone.

6. The apparatus including a mounting assembly of claim 4 wherein the mobile device is a camera.

7. The apparatus including a mounting assembly of claim 1 wherein apparatus is a medical device for viewing within a mammalian body.

8. The apparatus including a mounting assembly of claim 1 wherein apparatus is an optical pointing device.

9. The apparatus including a mounting assembly as claimed in claim 1, wherein the or each resilient finger extends substantially tangentially from said region of said lens barrel.

10. The apparatus including a mounting assembly as claimed in claim 9, wherein the or each resilient finger is defined by a slot having a first part extending substantially radially inwardly from an outer surface of the lens barrel and a second part extending from an inner end of said first part substantially concentrically to the outer surface of the lens barrel.

11. Apparatus including a mounting assembly, comprising:
    a lens barrel adapted to hold a lens or a lens assembly;
    a carriage assembly receiving the lens barrel;
    a set of cooperating screw threads provided with the lens barrel and a portion of the carriage assembly to allow rotation of the lens barrel with respect to the carriage assembly to enable the lens or lens assembly to be moved along an optical axis and adjust focus;
    one of said carriage and said lens barrel having a detented surface comprising a plurality of discrete recesses, the other of said carriage and said lens barrel having at least one first projection biased against said detented surface and at least one second projection biased against said detented surface,
    said at least one first projection engaging with said plurality of discrete recesses of the detented surface while the at least one second projection is positioned between the recesses to define a plurality of first stable rotational positions of said lens barrel with respect to said carriage assembly,
    said at least one second projection least one first projection, the at least one second projection engaging with said plurality of discrete recesses of the detented surface while the at least one first projection is positioned between the recesses to define a plurality of second stable rotational positions of said lens barrel with respect to said carriage assembly that are intermediate each of said plurality of first stable rotational positions.

12. The apparatus including a mounting assembly as claimed in claim 11, wherein the or each projection is formed integrally with said lens barrel.

13. The apparatus including a mounting assembly as claimed in claim 12, wherein the or each projection extends substantially perpendicularly and outwardly from a distal end of a resilient finger extending from a region of said lens barrel.

14. The apparatus including a mounting assembly as claimed in claim 13, wherein the or each resilient finger extends substantially tangentially from said region of said lens barrel.

15. The apparatus including a mounting assembly as claimed in claim 14, wherein the or each resilient finger is defined by a slot having a first part extending substantially radially inwardly from an outer surface of the lens barrel and a second part extending from an inner end of said first part substantially concentrically to the outer surface of the lens barrel.

16. The apparatus including a mounting assembly as claimed in claim 11, wherein at least three first projections are provided arranged at equal circumferential spacing around said detented surfaced.

17. The apparatus including a mounting assembly as claimed in claim 16, wherein one second projection is provided between each adjacent pair of first projections.

18. The apparatus including a mounting assembly as claimed in claim 11, wherein movement of the lens barrel between each first stable position and an adjacent second stable position results in an axial movement of the lens barrel with respect to the carriage assembly of less than 10 μm.

19. The apparatus including a mounting assembly as claimed in claim 18, wherein movement of the lens barrel between each first stable position and an adjacent second stable position results in an axial movement of the lens barrel with respect to the portion of the carriage assembly of approximately 5 μm.

20. Apparatus, comprising:
a disk shaped lens holder barrel;
a carriage having a central bore which receives the disk shaped lens holder barrel;
a detented surface comprising a plurality of discrete recesses extending around an inner surface of the central bore;
a first projection from the lens holder barrel engaging with said detented surface;
a second projection from the lens holder barrel engaging with the detected surface;
the first projection and second projection being angularly displaced from each other such that when one of the first and second projections engages a discrete recesses of the detented surface the other of the first and second projections engages a ridge between adjacent discrete recesses.

21. The apparatus of claim 20, wherein each first and second projection extends substantially perpendicularly and outwardly from a distal end of a resilient finger formed from lens holder barrel.

22. The apparatus of claim 21, wherein each resilient finger extends substantially tangentially from a region of said lens holder barrel.

23. The apparatus of claim 22, wherein each resilient finger is defined by a slot formed in the disk shaped lens holder barrel.

24. The apparatus of claim 23, wherein each slot comprises a first part extending substantially radially inwardly from an outer perimeter surface of the disk shaped lens holder barrel and a second part extending from an inner end of said first part substantially concentrically to the outer perimeter surface.

25. Apparatus, comprising:
a cylindrical lens holder barrel;
a carriage having a central bore which receives the cylindrical lens holder barrel;
a detented surface comprising a plurality of discrete recesses extending around an inner surface of the central bore and a ridge surface between adjacent recesses;
a first set of projections extending radially from the lens holder barrel which engage with said detented surface;
a second set of projections extending radially from the lens holder barrel which engage with the detected surface;
the first set of projections engaging corresponding discrete recesses of the detented surface at a first angular position where the second set of projections engage ridge surfaces, and the second set of projections engaging corresponding discrete recesses of the detented surface at a second angular position where the first set of projections engage ridge surfaces.

26. The apparatus of claim 25 wherein the first angular position comprises one of a first plurality of angular positions, and the second angular position comprises one of a second plurality of angular positions, any one of the first angular positions being located between adjacent second angular positions.

* * * * *

UNITED STATES PATENT AND TRADEMARK OFFICE
CERTIFICATE OF CORRECTION

| | | |
|---|---|---|
| PATENT NO. | : 7,787,194 B2 | Page 1 of 1 |
| APPLICATION NO. | : 12/358854 | |
| DATED | : August 31, 2010 | |
| INVENTOR(S) | : Nairn et al. | |

It is certified that error appears in the above-identified patent and that said Letters Patent is hereby corrected as shown below:

With regard to Claim 11:

At Column 6, at or about Lines 32-33, please delete the following text:

"said at least one second projection least one first projection, the at least one second projection engaging with said"

and replace with the following text:

-- said at least one second projection engaging with said --

Signed and Sealed this
Tenth Day of May, 2011

David J. Kappos
*Director of the United States Patent and Trademark Office*